Figure 3:
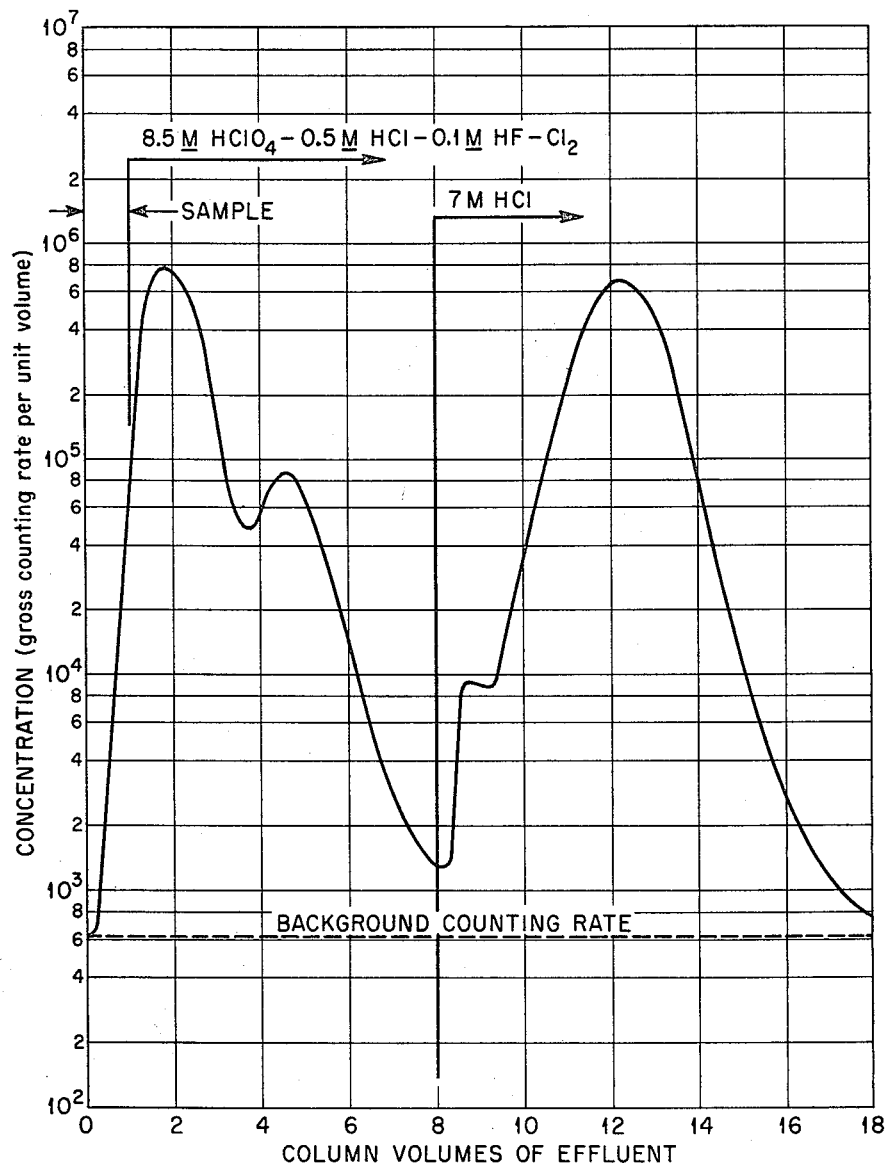

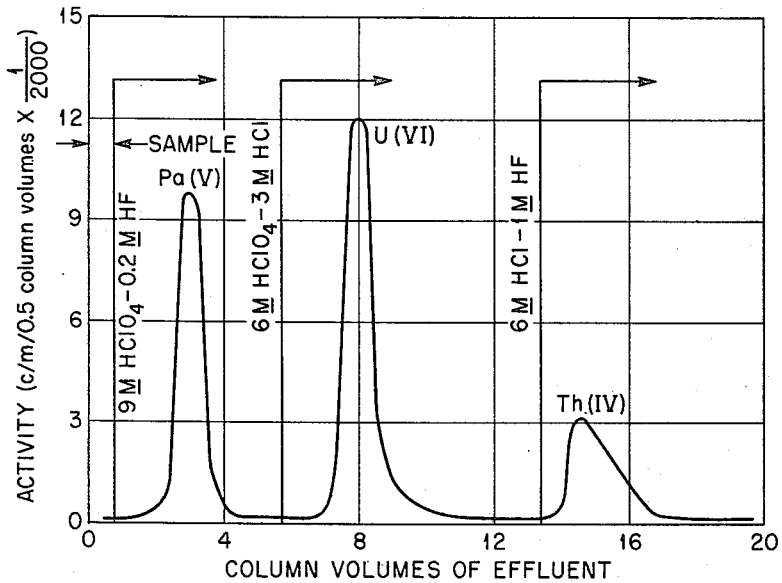
Fig. 1.
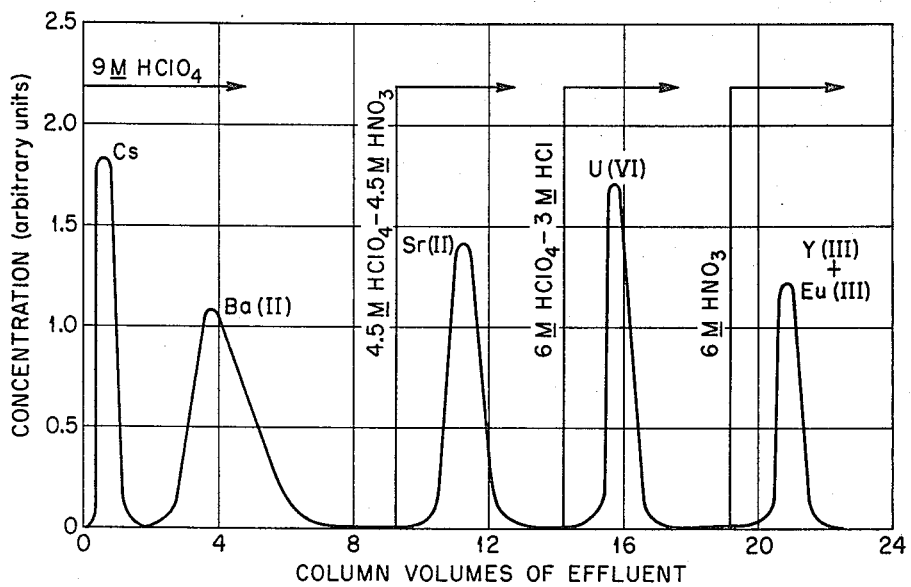
Fig. 2.
INVENTORS.
Kurt A. Kraus
Fred Nelson
BY
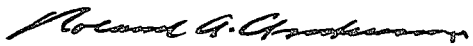
ATTORNEY.

# 3,188,169
SEPARATION OF METAL VALUES BY CATION EXCHANGE FROM CONCENTRATED PERCHLORIC ACID SOLUTION

Kurt A. Kraus and Fred Nelson, Oak Ridge, Tenn., assignors to the United States of America as represented by the United States Atomic Energy Commission
Filed Sept. 20, 1962, Ser. No. 225,171
9 Claims. (Cl. 23—14.5)

Our invention relates to cation exchange processes for the separation of metal values and more particularly to an improved solution for effecting selective adsorption and desorption of metal values on cation exchange resins.

Cation exchange processes are widely useful for the separation and recovery of metal values. In this type process a solution containing metal cations is contacted with a cation exchange resin and the metal values are adsorbed by the resin. The loaded resin is then selectively desorbed with an eluent solution to recover the metal values in distinct fractions. The basis for separations of this type is the difference in the distribution coefficient, D, that is, the ratio of the amount of metal adsorbed per unit mass of resin divided by the amount of metal in solution per unit volume of solution, for the individual metals. Cation exchange processes are particularly useful in the radiochemical field for separation of fission product activities and for recovery of specific isotopes from irradiated target material. Other applications are in the isolation and purification of particular metals and in analytical processes.

To facilitate these separations it is desired to provide a solution medium with maximum versatility for effecting selective sorption and desorption of a variety of metallic elements. Of particular interest are fission product elements such as strontium, yttrium and rare earths and actinide elements such as thorium, uranium, plutonium and neptunium.

It is, therefore, an object of our invention to provide a method of separating metal values.

Another object is to provide a method of separating metallic fission product elements and actinide elements from one another.

Another object is to provide an improved solution for effecting selective adsorption of metal values on cation exchange resins.

Another object is to provide an improved solution for selective elution of metal values from cation exchange resins.

Other objects and advantages of our invention will be apparent from the following detailed description and claims appended hereto.

In accordance with our invention, mixtures of metal values are separated by contacting a concentrated perchloric acid containing the mixture of metal values, together with a minor portion of at least one other mineral acid, with a cation exchange resin whereby the metal values are selectively adsorbed and selectively eluting the adsorbed metal values from the resin. Separation of individual elements or groups of elements is obtained in both the adsorption and desorption steps. This medium is particularly useful for separating the components of fission product and actinide element mixtures.

In its broadest scope our invention comprises a process for separating a mixture of metallic elements into two groups, to be referred to herein as "strongly adsorbed" and "weakly adsorbed." The strongly adsorbed elements exhibit relatively high distribution coefficients and require selected eluents or numerous column volumes of eluent for removal from the resin. The strongly adsorbed group consists of the following elements, listed by chemical symbol and valence state: Ca (II), Sr (II), Tl (III), Sc (III), Y (III), the entire rare earth group, elements 58 through 71 (III), Am (III), Cm (III), and remaining trivalent actinides, elements 97 through 103 (III), Fe (III), Ga (III), Th (IV), Sb (V), U (VI), Pu (VI) and Np (VI). The weakly adsorbed elements either are not adsorbed or are removed rapidly, i.e., within 10 column volumes of eluent, from the resin with an eluent of the same acid composition as the feed solution. This group consists of the following elements, listed by chemical symbol and valence state: Li (I), Na (I), K (I), Rb (I), Cs (I), Ag (I), Tl (I), Be (II), Mg (II), Ba (II), Ra (II), Mn (II), Co (II), Zn (II), Cu (II), Cd (II), Hg (II), Pd (II), Au (III), Cr (III), In (III), Bi (III), Rh (III), Sb (III), Ir (III), Al (III), Ti (IV), Zr (IV), Hf (IV), Ge (IV), Sn (IV), Po (IV), V (IV), Ir (IV), Pt (IV), Pd (IV), Ru (IV), Nb (V), Ta (V), Pa (V), As (V), V (V), Mo (VI), W (VI), Te (VI), Tc (VII) and Re (VII). The valence states given above are the usual states in which these elements exist under the oxidizing conditions of the concentrated perchloric acid-mineral acid medium. Some of these elements may exist in more than one valence state in this medium, and, in the case of antimony and thallium, ions in the higher valence state are strongly adsorbed while those in the lower valence state are not adsorbed. Complete adsorption of these elements may be obtained by providing in the solution a further oxidizing agent such as gaseous chlorine dissolved at a level slightly in excess of stoichiometric for oxidation to the higher valence states.

The acid composition of the feed solution in the adsorption step is critical to our invention. Improved separations are obtained with this system as a result of the increased distribution coefficients at high perchloric acid concentrations. A perchloric acid concentration of at least 6 molar is required, and about 8 to 10 molar is preferred. Higher concentrations may be employed, but reaction kinetics are adversely affected. A minor portion of at least one mineral acid selected from the group consisting of hydrofluoric acid, hydrochloric acid, nitric acid and sulfuric acid is provided in the feed solution to control the extent of adsorption of the various metals and to solubilize metallic elements which otherwise tend to form precipitates in concentrated perchloric acid through the mechanism of hydrolytic precipitation and other reactions. For feed solutions containing elements of the fourth and fifth groups, e.g., titanium, zirconium, niobium, tantalum and protactinium, hydrofluoric acid is used to prevent precipitation. An HF concentration of about 0.01 to 1.0 molar is normally suitable for this purpose. For solutions containing gold and elements of the platinum group, e.g., platinum, palladium, rhodium and iridium, hydrochloric acid at a concentration of about 0.5 molar is employed. At lower HCl concentrations some of the platinum elements are partially adsorbed and at higher concentrations the distribution coefficients for uranium and other strongly adsorbed elements is decreased. The particular mineral acid additive is selected, depending on the type of precipitate-forming elements in the solution, and where both types are present both HCl and HF may be employed. These acids at the stated concentrations also serve to control the extent of adsorption of the various metals as listed in the strongly adsorbed and weakly adsorbed categories described above. Nitric acid or sulfuric acid may also be employed as the added mineral acid, but the particular elements which make up the strongly adsorbed and weakly adsorbed categories will be altered slightly. A concentration of about 0.5 molar to 2 molar is suitable for these acids.

The perchloric acid-mineral acid solution containing a mixture of weakly adsorbed and strongly adsorbed elements is contacted with a cation exchange resin, and the strongly adsorbed elements are readily removed from solution, e.g., in a single pass through a resin column. Most of the weakly adsorbed elements remain in solution, although a minor portion is adsorbed. This portion is removed by contacting the loaded resin with a perchloric acid-mineral acid solution, preferably of the same acid composition as the feed solution. Substantially complete removal is readily effected, e.g., within 10 column volumes of eluent under typical conditions. The strongly adsorbed elements are then removed from the resin by elution, and further separations may be effected by adjusting the composition of the eluent solution. All of the strongly adsorbed elements except thorium may be removed simultaneously with a hydrochloric acid solution eluent having an HCl concentration of about 4 to 7 molar, and thorium may be removed along with the rest by providing hydrofluoric acid at a concentration of about 0.01 to 1.0 molar in the HCl solution. The following separations of strongly adsorbed elements may be performed by selective elution where a mixture of these elements is present on the resin. Strontium is separated from yttrium, scandium, trivalent rare earths and trivalent actinide elements by contacting the resin with an aqueous solution containing perchloric acid at a concentration of about 4.5 molar and nitric acid at a concentration of about 4.5 molar. Strontium is removed in the eluent solution and the other elements remain on the resin. Strontium and calcium present in a mixture with scandium and uranium are removed simultaneously with an eluent of the same composition. Uranium, plutonium and neptunium are removed as a group from a mixture with yttrium, scandium trivalent rare earths and trivalent actinides by eluting with an aqueous solution containing perchloric acid at a concentration of about 6 molar, and hydrochloric acid at a concentration of about 3 molar.

The method of our invention is particularly applicable to the separation of actinide element mixtures. For example, a mixture of uranium, thorium and protactinium values may be separated by employing a solution medium comprising at least 6 molar, and preferably 8.5 to 10 molar, perchloric acid and about 0.01 to 1.0 hydrofluoric acid. The solution is contacted with a cation exchange resin whereby the thorium and uranium values are strongly adsorbed and protactinium is weakly adsorbed. Protactinium values are selectively removed by contacting the loaded resin with a solution of the same acid composition as the starting solution. Uranium values are then selectively eluted with a hydrochloric acid solution having a concentration of 5 to 12 molar, with a nitric acid solution having a concentration of 5 to 12 molar or with a 3 molar hydrochloric acid-6 molar perchloric acid solution. The thorium values are then eluted with a solution containing 0.1 to 1.0 molar hydrofluoric acid and either nitric acid or hydrochloric acid at a concentration of about 5 to 10 molar.

In another embodiment of our invention the components of a fission-product- and actinide-element-containing solution obtained by dissolution of neutron-irradiated fissionable material are separated into two groups. The acid composition of the starting solution is adjusted to at least 6 molar, and preferably 8 to 10 molar, perchloric acid, 0.5 molar hydrochloric acid and 0.01 to 1.0 molar hydrofluoric acid. The solution is then contacted with a cation exchange resin and the following elements are strongly adsorbed: strontium, yttrium, rare earths, gallium, uranium, neptunium and plutonium. The rest of the fission products, e.g., zirconium, niobium, molybdenum, rubidium, cesium and barium, either remain in solution or are weakly adsorbed. The weakly adsorbed elements are removed by elution with the same acid composition as the starting solution, leaving the strongly adsorbed elements on the resin. The latter group is then eluted with a hydrochloric acid solution having a concentration of 5 to 7 molar. This process is useful as a preliminary step for breaking the fission product and actinide element mixture into groups. The resulting groups may then be further separated by the methods described above or by previously known ion exchange or solvent extraction methods.

An alternative separation step which may be employed in combination with our invention is the separation of volatile elements. Numerous elements are volatilized from perchloric acid solution when the solution is heated to the boiling point. Included in this group are the following: ruthenium, antimony, germanium, technetium, arsenic, selenium, rhenium, iodine and noble gases such as krypton and xenon. Volatilization is enhanced by providing hydrobromic acid in the starting solution and evaporating the solution. This step may be employed to remove volatile fission products prior to the adsorption step in the separation of fission product mixtures.

The cation exchange resin in the method of our invention is not limited to a particular resin, but resins of the sulfonated polystyrene divinyl benzene type are preferred. An example of a suitable material is the resin available commercially under the trade name "Dowex 50." The physical properties of the resin are not critical, but finely divided material is preferred to obtain rapid adsorption and desorption reactions.

The method of contacting the resin with the feed and eluent solutions is not critical, and conventional ion exchange techniques may be employed. In a preferred embodiment the resin is disposed as a bed in an elongated vertical column and the solutions are passed through the column.

The temperature in the adsorption and desorption steps is not critical, and room temperature may be employed. In order to obtain more rapid exchange reactions, however, elevated temperatures are preferred for each of these steps. A temperature in the range of 50° to 75° C. is particularly suitable.

The concentration of the various metal values in the feed solution is not critical and any concentration up to saturation in the perchloric acid-mineral acid solution may be employed. For some elements, e.g., rare earths in the presence of hydrofluoric acid or silver in the presence of hydrochloric acid, solubility is low so that this method is effective only for small quantities of material.

Our invention is further illustrated by the following specific examples.

*Example I*

Tracer amounts of protactinium, uranium and thorium were separated by means of the following procedure: A sample solution was prepared to contain 9 molar perchloric acid, 0.2 molar hydrofluoric acid and protactinium, uranium and thorium activities each at a level of $2 \times 10^4$ disintegrations per minute. 0.5 milliliter of this solution was passed through a "Dowex-50" resin column 3 centimeters long and 0.28 square centimeter in cross sectional area at a flow rate of 0.4 centimeter per minute and a temperature of 50° C. Substantially all of the radioactive material was adsorbed on the resin. The resin was then successively contacted with 6 column volumes of 9 molar perchloric-0.2 molar hydrofluoric acid solution, 7 column volumes of 6 molar perchloric-3 molar hydrochloric acid solution and 7 column volumes of 6 molar hydrochloric-1 molar hydrofluoric acid solution. The activity of the effluent solution was periodically measured and recorded. The results obtained may be seen by reference to FIGURE 1 in the drawing wherein the activity of the effluent in succeeding column volumes is graphically shown. It may be seen that these activities were eluted in distinct peaks and that a sharp separation was obtained.

*Example II*

Separation of cesium, barium, strontium, uranium, yttrium and europium was effected by means of the following procedure: A 9 molar perchloric acid solution containing tracer quantities of radioisotopes of each these elements was passed through a "Dowex-50" resin column in the manner of Example I. The loaded resin was then successively eluted with 8 column volumes of 9 molar perchloric acid solution, and 5 column volumes each of 4.5 molar perchloric acid-4.5 molar nitric acid, 6 molar perchloric acid-3 molar hydrochloric acid and 6 molar nitric acid. The activity of the effluent was periodically measured and recorded. The results obtained may be seen by reference to FIGURE 2 wherein the concentrations of each element in successive column volumes are graphically represented. It may be seen that each of the elements was sharply separated from the others, with the exception of yttrium and europium, which elements were eluted simultaneously.

*Example III*

Irradiated uranium containing fission products and other actinide elements was separated into groups of elements by means of the following procedure: A 0.1 milligram sample of enriched $U_3O_8$ (93 percent $U^{235}$, 7 percent $U^{238}$, trace $U^{236}$) was irradiated 16 hours in a neutron flux of $10^{13}$ neutrons per square centimeter per second. After a three-day cooling period the sample was dissolved in 5 milliliters of concentrated nitric acid. An aliquot of the resulting solution containing $10^8$ gamma counts per minute was combined with 0.5 ml. of 10–12 molar perchloric acid and 5 ml. of 9 molar hydrobromic acid. The resulting mixture was evaporated until fumes appeared, and the addition of HBr and evaporation were repeated twice. Volatile fission products (Ge, Se, Br, Kr, Tc, Ru, Sn, Sb, I, Xe and As) were removed in this procedure. The solution was then converted to 8.5 molar perchloric acid-0.5 molar hydrochloric acid and 0.1 molar hydrofluoric acid by addition of the latter acids. A one milliliter aliquot of the adjusted solution was then passed through a column 0.6 cm. inside diameter by 12 cm. in length loaded with "Dowex-50" resin. After the sample passed through the resin 7 column volumes (5.9 ml.) of 8.5 molar perchloric acid-0.5 molar hydrochloric acid-0.1 molar hydrofluoric acid solution was passed through the resin bed. Nine column volumes (7.5 ml.) of 7 molar hydrochloric acid was then passed through the resin. The activity of the effluent solution was periodically measured and recorded. The results obtained may be seen by reference to FIGURE 3 wherein the concentrations of eluted elements at succeeding column volumes are represented graphically. It may be seen that the activity is separated into two distinct fractions by this procedure.

The above examples are merely illustrative and are not to be understood as limiting the scope of our invention, which is limited only as indicated by the appended claims. It is also to be understood that variations in apparatus and procedure may be employed by one skilled in the art without departing from the scope of our invention.

Having thus described our invention, we claim:

1. The method of separating values of at least one metal in a first group consisting of Li (I), K (I), Rb (I), Ag (I), Tl (I), Be (II), Mg (II), Ba (II), Ra (II), Mn (II), Co (II), Zn (II), Cu (II), Cd (II), Hg (II), Pd (II), Au (III), Cr (III), In (III), Bi (III), Rh (III), Sb (III), Ir (III), Al (III), Ti (IV), Zr (IV), Hf (IV), Ge (IV), Sn (IV), Po (IV), V (IV), Ir (IV), Pt (IV), Pd (IV), Ru (IV), Nb (V), Ta (V), Pa (V), As (V), V (V), Mo (VI), W (VI), Te (VI), Tc (VII) and Re (VII) from values of at least one metal in a second group consisting of Ca (II), Sr (II), Tl (III), Sc (III), Y (III), rare earths (III), trivalent actinides (III), Fe (III), Ga (III), Th (IV), Sb (V), U (VI), Pu (VI) and Np (VI) which comprises contacting an aqueous solution containing values from both of said groups together with perchloric acid at a concentration of at least 6 molar, hydrofluoric acid at a concentration of 0.01 to 1.0 molar and hydrochloric acid at a concentration of about 0.5 molar, with a cation exchange resin whereby said values from said second group are strongly adsorbed and a portion of said values from said first group are weakly adsorbed and selectively eluting said weakly adsorbed values.

2. The method of claim 1 wherein the concentration of perchloric acid in said aqueous solution is about 8 to 10 molar.

3. The method of claim 1 wherein said cation exchange resin is a sulfonated polystyrene divinyl benzene resin.

4. The method of separating thorium values, uranium values and protactinium values from a mixture containing the same which comprises dissolving said mixture in an aqueous solution containing perchloric acid at a concentration of about 8 to 10 molar and hydrofluoric acid at a concentration of 0.01 to 1.0 molar, contacting the resulting solution with a cation exchange resin whereby said protactinium values are weakly adsorbed and said uranium values and said thorium values are strongly adsorbed, contacting the resulting loaded resin with an aqueous solution containing perchloric acid at a concentration of at least 6 molar and hydrofluoric acid at a concentration of about 0.01 molar to 1.0 molar whereby said protactinium values are selectively removed, contacting the resulting partially unloaded resin with an aqueous mineral acid solution selected from the group consisting of nitric acid at a concentration of at least 6 molar, hydrochloric acid at a concentration of 5 to 12 molar and 6 molar perchloric aid-3 molar hydrochloric acid, whereby said uranium values are selectively removed, and then contacting said resin with an aqueous solution containing hydrofluoric acid at a concentration of 0.01 to 1.0 molar and a mineral acid selected from the group consisting of hydrochloric acid at a concentration of 5 to 10 molar and nitric acid at a concentration of 5 to 10 molar whereby said thorium values are removed.

5. The method of separating strontium values and calcium values from uranium values and scandium values which comprises contacting a cation exchange resin having adsorbed thereon a mixture of all of said values with an aqueous solution containing perchloric acid at a concentration of about 4.5 molar and nitric acid at a concentration of about 4.5 molar whereby said strontium values and said calcium values are eluted.

6. The method of separating uranium values, plutonium values and neptunium values from values of yttrim, scandium, trivalent rare eaths and actinides having an atomic number of at least 95 which comprises contacting a cation exchange resin having a mixture of all of said values adsorbed thereon with an aqueous solution containing perchloric acid at a concentration of about 6 molar and hydrochloric acid at a concentration of about 3 molar, whereby said uranium values, plutonium values and neptunium values are eluted.

7. The method of separating a fission-product other than Na and Cs- and actinide-element-containing mixture produced by subjection of fissionable material to neutron irradiation into groups which comprises dissolving said irradiated fissionable material in an aqueous solution containing perchloric acid at a concentration of at least 6 molar, hydrofluoric acid at a concentration of 0.01 to 1.0 molar and hydrochloric acid at a concentration of about 0.5 molar, contacting the resulting solution with a cation exchange resin whereby a first group of said fission products and actinide elements is strongly adsorbed and a second group is weakly adsorbed, and selectively eluting said weakly adsorbed group and said strongly adsorbed group.

8. The method of claim 7 wherein said solution is evaporated in the presence of hydrobromic acid, whereby volatile elements are removed, prior to contacting said resin.

9. The method of separating values of at least one metal in a first group consisting of Li (I), K (I), Rb (I), Ag (I), Tl (I), Be (II), Mg (II), Ba (II), Ra (II), Mn (II), Co (II), Zn (II), Cu (II), Cd (II), Hg (II), Pd (II), Au (III), Cr (III), In (III), Bi (III), Rh (III), Sb (III), Ir (III), Al (III), Ti (IV), Zr (IV), Hf (IV), Ge (IV), Sn (IV), Po (IV), V (IV), Ir (IV), Pt (IV), Pd (IV), Ru (IV), Nb (V), Ta (V), Pa (V), As (V), V (V), Mo (VI), W (VI), Te (VI), Tc (VII), and Re (VII), from values of at least one metal in a second group consisting of Ca (II), Sr (II), Tl (III), Sc (III), Y (III), rare earths (III), trivalent actinides (III), Fe (III), Ga (III), Th (IV), Sb (V), U (VI), Pu (VI), and Np (VI) which comprises contacting an aqueous solution containing values from both of said groups together with perchloric acid at a concentration of at least 6 molar, hydrofluoric acid at a concentration of 0.01 to 1.0 molar and hydrochloric acid at a concentration of about 0.5 molar, with a cation exchange resin whereby said values from said second group are strongly adsorbed and a portion of said values from said first group are weakly adsorbed, contacting the resulting loaded resin with a second aqueous solution containing perchloric acid at a concentration of at least 6 molar whereby said weakly adsorbed values are removed and then contacting said resin with a third aqueous solution containing hydrochloric acid at a concentration of about 4 to 7 molar and hydrofluoric acid at a concentration of about 0.01 to 1.0 molar whereby said strongly adsorbed values are removed.

References Cited by the Examiner

Choppin et al.: Inorganic Chemistry, vol. 1, No. 1, February 1962, pages 140–145.

CARL D. QUARFORTH, *Primary Examiner.*